United States Patent
Nuengsigkapian et al.

(10) Patent No.: US 12,520,028 B2
(45) Date of Patent: Jan. 6, 2026

(54) CASCADED MODELS FOR CONTEXT AWARENESS WITH WEARABLE DEVICES

(71) Applicant: Google LLC, Mountain View, CA (US)

(72) Inventors: Cattalyya Nuengsigkapian, Mountain View, CA (US); Stephanie Renee Debats, Foster City, CA (US)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 18/349,590

(22) Filed: Jul. 10, 2023

(65) Prior Publication Data

US 2025/0024131 A1    Jan. 16, 2025

(51) Int. Cl.
*H04N 23/61*    (2023.01)
*H04N 23/667*    (2023.01)

(52) U.S. Cl.
CPC ........... *H04N 23/61* (2023.01); *H04N 23/667* (2023.01)

(58) Field of Classification Search
CPC .............................. H04N 23/61; H04N 23/667
USPC ....................................................... 348/222.1
See application file for complete search history.

(56) References Cited

U.S. PATENT DOCUMENTS

| 11,747,891 B1* | 9/2023 | Hermsen ................. G06F 3/011 |
| | | 345/156 |
| 2022/0366170 A1* | 11/2022 | Wang ..................... G06N 20/00 |
| 2023/0283886 A1* | 9/2023 | Kocienda ............... H04N 23/72 |

OTHER PUBLICATIONS

"Adapt Your App By Understanding What Users Are Doing", retrieved on Jul. 10, 2023 from https://developers.google.com/location-context/activity-recognition, 3 pages.
Premebida, et al., "A Cascade Classifier Applied in Pedestrian Detection Using Laser and Image-Based Features", IEEE Conference on Intelligent Transportation Systems, https://www.researchgate.net/publication/224190834, Oct. 2010, 7 pages.

* cited by examiner

*Primary Examiner* — Joel W Fosselman
(74) *Attorney, Agent, or Firm* — Brake Hughes Bellermann LLP

(57) ABSTRACT

Described techniques enable fast and accurate context determination while conserving power and computational resources, as well as preserving user privacy. A sensor signal may be received from a sensor associated with a wearable device, and may be processed using a first machine learning (ML) model to determine a context indicator for a context of the wearable device. A camera of the wearable device may be activated to obtain at least one image, based on the context indicator. The at least one image may be processed using a second ML model to determine the context of the wearable device.

17 Claims, 9 Drawing Sheets

CASCADED MODELS FOR CONTEXT AWARENESS WITH WEARABLE DEVICES

TECHNICAL FIELD

This description relates to context awareness for wearable devices.

BACKGROUND

Wearable devices, including head mounted devices (HMD) such as smartglasses, may be worn by users in many different contexts. For example, users may wear wearable devices while in school or at work, while driving, or while socializing.

Functions of the wearable devices that are preferred by users at a point in time may vary based on a user context at the point in time. For example, a user may prefer to use different applications while at work than when socializing. In other examples, it may be beneficial to restrict user access to some wearable device functions based on user context. For example, a user may be restricted from using some applications while at work, or while driving.

SUMMARY

Described techniques use multiple sensors and multiple machine learning models to optimize context detection for wearable devices. For example, a first sensor signal from a first sensor may be processed by a first machine learning (ML) model to provide coarse-grained context determination, where the first sensor (e.g., an inertial measurement unit (IMU)) and the first ML model may be chosen to consume low levels of power and computational resources while providing frequent or continuous outputs. Based on the coarse-grained context determination, a second sensor, such as an image sensor, or camera, may be activated for a determined window of time (e.g., a few seconds). While active, the camera may collect a second sensor signal, such as one or more image frames, which may then be processed by a second, fine-grained ML model to make a final context determination. The second sensor and second ML model may be more capable of making a detailed context determination than the first sensor and the first ML model, but may consume more power and computational resources than the first sensor and the first ML model. Consequently, described techniques enable effective context determination while optimizing power and resource usage for wearable devices.

In a general aspect, a computer program product that is tangibly embodied on a non-transitory computer-readable storage medium and includes instructions that, when executed by at least one computing device, are configured to cause the at least one computing device to receive a sensor signal from a sensor associated with a wearable device and process the sensor signal using a first machine learning (ML) model to determine a context indicator for a context of the wearable device. When executed, the instructions cause the at least one computing device to activate a camera of the wearable device to obtain at least one image, based on the context indicator, and process the at least one image using a second ML model to determine the context of the wearable device.

According to another general aspect, a wearable device includes at least one memory, at least one processor, at least one sensor, and at least one camera. The processor, when executing instructions stored using the at least one memory, causes the wearable device to receive a sensor signal from the at least one sensor and process the sensor signal using a first machine learning (ML) model to determine a context indicator for a context of the wearable device. The processor, when executing instructions stored using the at least one memory, causes the wearable device to activate the camera to obtain at least one image, based on the context indicator, and process the at least one image using a second ML model to determine the context of the wearable device.

According to another general aspect, a method includes receiving a sensor signal from a sensor associated with a wearable device, and processing the sensor signal using a first machine learning (ML) model to determine a context indicator for a context of the wearable device. The method includes activating a camera of the wearable device to obtain at least one image, based on the context indicator, and processing the at least one image using a second ML model to determine the context of the wearable device.

The details of one or more implementations are set forth in the accompanying drawings and the description below. Other features will be apparent from the description and drawings, and from the claims.

DETAILED DESCRIPTION

Figure 1:
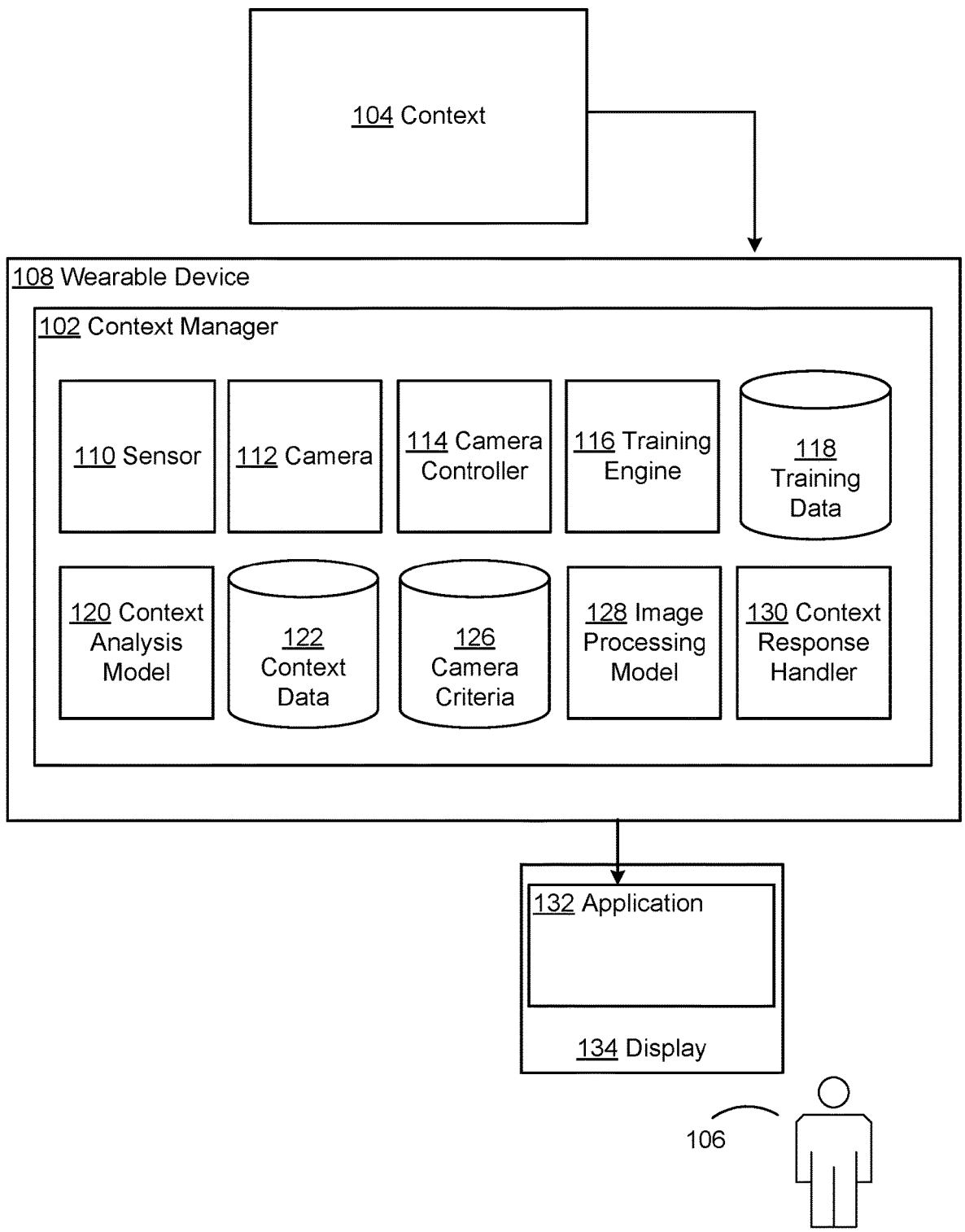
FIG. 1 is a block diagram of a system for context awareness for wearable devices.

Described systems and techniques enable accurate, customized context awareness for users of wearable devices, while providing efficient use of battery power and computing resources that are available to the wearable devices. Moreover, described systems and techniques enable desired levels of privacy of users of wearable devices, while still providing context awareness and associated benefits.

As used herein, a context of a user refers to one or more current physical circumstances of the user, which enables an assessment of a situation, scenario, statement, activity, role, or event experienced by the user. Context thus refers to an environment or setting of the user, or individual elements/aspects thereof, which may be relevant to, or associated with, corresponding preferences or permissions of potential activities of the user.

Determining user context thus enables fast, customized access (or access restrictions) to applications, functions, or other user experiences provided by a wearable device, such as smartglasses or other head-mounted devices (HMDs). For example, as referenced above, and described in more detail below, a user may prefer to use, or have access to, different applications in different situations (e.g., home, school, or work).

A large number and wide variety of user contexts may exist, and may be characterized or defined in varying ways and/or to varying degrees of detail. For example, when a user is in a home environment, a context may be defined as 'home,' or 'home/kitchen,' or 'home/kitchen/cooking.' Similarly, a work environment may be further parsed into defined work locations and/or activities, or a car environment may be further categorized as 'car/driver,' or 'car/passenger.'

As described herein, machine learning models may be trained to classify or otherwise recognize different contexts, using inputs from one or more types of sensors. Such machine learning models may be trained to recognize large numbers of different contexts across many different users, and at many different levels of detail. For example, as described in detail, below, a classifier model may be trained to classify a current context from among a defined set of potential contexts, and/or a convolutional neural network (CNN) may be trained to process one or more image frames to classify a context.

Some such ML models, however, may require significant levels of power and computational resources to operate. In general, ML models that are capable of making relatively more detailed, fine-grained, or personalized context determinations may require more data, consume more power, and/or use more computational resources than ML models that are designed and able to make relatively less detailed, coarse-grained, or generic context determinations.

Additionally, ML models may be trained to process sensor signals from one or more various types of sensors to make such context determinations. Such sensors may also vary widely in terms of power/resource consumption, as well as in terms of the type and extent of data gathered and provided to the ML models.

As set forth in detail, below, described techniques use sensor signals from one or more sensors to make a first context determination using a first ML model. The first ML model may have relatively low power/resource requirements, and may be trained to use sensor signals from sensors that may be used frequently or continuously, without themselves using significant quantities of power and/or computational resources. Such sensors may include, e.g., inertial measurement units (IMUs), which may include one or more accelerometers, gyroscopes, and/or magnetometers. The first context determination thus provided may be a coarse-grained context determination and/or may be a context determination with a relatively low level of confidence.

Then, based on the first context determination, a second sensor(s) may be activated for a defined period or window of time, and used within that time to make a second or final context determination. For example, an image sensor, e.g., camera, may be activated for a defined time window (e.g., for 'n' seconds) and used within that time window to capture one or more image frames. Additionally, or alternatively, a global positioning system (GPS) sensor may be activated and/or used. A second ML model may then process sensor signals (e.g., image frames) from the one or more second sensors to make a second, final context determination. For example, the second context determination thus provided may be a fine-grained context determination and/or may be a context determination with a relatively high level of confidence.

In this way, use of the second sensor(s) and corresponding second ML model(s) may be conserved or minimized. As a result, battery and computational resources may also be conserved. Moreover, a user may minimize use of sensors such as cameras and GPS sensors for privacy purposes/preferences, while still obtaining the advantages of fast, accurate context determinations.

FIG. 1 is a block diagram of a system for context awareness for wearable devices. In the example of FIG. 1, a context manager 102 is configured to determine a context 104 of a user 106 who is wearing a wearable device 108. The context 104, or characteristics thereof as determined by the context manager 102, may thus be used to enhance and optimize an experience of the user 106 with respect to use of the wearable device 108.

The context manager 102 should be understood to represent software, or a combination of software and hardware, designed and configured to determine or characterize aspects of the context 104. In the simplified example of FIG. 1, the context manager 102 is illustrated as a single unit or module implemented by, or operating on, the wearable device 108. In various implementations, as described below, e.g., with respect to FIGS. 7 and 8, aspects of the context manager 102 may be operated remotely from the wearable device 108, e.g., using a network connection of the wearable device 108 and a separate device(s), which may be proximate to, and/or remote from, the user 106.

The wearable device 108 is illustrated generically in FIG. 1, and should be understood to represent any suitable wearable device, including any suitable HMD. Additional examples of wearable devices, including various types of HMDs, smartwatches, smart car buds, and various other wearable devices, are provided below with respect to FIGS. 7 and 8.

The context manager 102 is illustrated as including a sensor 110 and a camera 112. The sensor 110 may represent two or more sensors, including two or more of an accelerometer, gyroscope, magnetometer, microphone, or any device/network interface (e.g., a Bluetooth or wi-fi interface). The camera 112 is itself an example of a sensor, but is shown separately in FIG. 1 for ease of description. As referenced above, the sensor 110 and the camera 112 may represent both software and any associated hardware elements. Although shown as elements of the context manager 102 in FIG. 1, one or more of the sensor 110 and the camera 112 may be understood to be implemented outside of the context manager 102, with outputs thereof being received at the context manager 102. The sensor 110 may be understood to represent an example(s) of a relatively low power sensor, such as those referenced above, while the camera 112 may be understood to represent an example of a relatively high-power sensor. Other high-power sensors, and/or sensors that are use-sensitive with respect to privacy or other suitable criteria, may be used, as well, such as GPS sensors.

A camera controller 114 represents any element(s) used to control an operation of the camera 112. For example, the camera controller 114 may be configured to activate or deactivate the camera 112, or to activate or deactivate individual functions of the camera 112.

As shown in FIG. 1, the context manager 102 may include or utilize a training engine 116 configured to utilize training data 118 to train and deploy one or more types or instances of ML models, some examples of which are provided below. For example, different types of ML models may include classifiers, extractors, object detectors, and/or neural networks. Such ML models may be trained to process defined types of input, such as inputs from the sensor 110 and/or the camera 112, to thereby generate outputs that assist in determining a nature or aspects of the context 104. As noted above, the training engine 116 and the training data 118 are illustrated as individual discrete elements of the context manager 102 on the wearable device 108, but may be implemented partially or completely using remote resources. For example, primary training of a ML model may be implemented at a remote server, while individual fine-tuning of an ML model may be performed at the wearable device 108, including fine-tuning designed to personalize operations of the context manager 102 for the user 106.

A context analysis model 120 provides an example of a trained ML model that may be used by the context manager 102. As described above, the context analysis model 120 may represent a first ML model that is trained and designed to process one or more sensor signals from the sensor 110, e.g., to provide coarse-grained context determinations with respect to the context 104.

For example, the context analysis model 120 may be implemented as a classifier. In the present description, a classifier refers generally to any trained model or algorithm that processes sensor signals from the sensor 110, perhaps in conjunction with an output from at least one preceding classifier, to associate some or all of the sensor signal(s) with at least one class of a plurality of pre-defined classes. For example, the training data 118 may include known instances of training sensor signals that are each associated with a corresponding class label. Classifiers may be implemented, for example, as a naïve Bayesian classifier, decision tree classifier, neural network/deep learning classifier, or support vector machine, or any suitable classifier or combination of classifiers.

In the case of the context classification, classification training data may thus include many examples of sensor signals that are each associated, for example, with context classes, where the contexts may include, e.g., work, home, school, social, or individual conversations, or any desired context class assigned as a label to corresponding training data within the training data 118.

Further in the present description, an extractor may represent any trained model or algorithm designed to identify and extract content or information that may be useful or important with respect to context determination, based on sensor signals from the sensor 110. For example, the sensor 110 may include a microphone, so that the sensor signals include captured audio. The captured audio may be processed to extract key information that may be useful in identifying aspects of the context 104. For example, as described below with respect to FIG. 3, such captured audio may be used to determine a wake word or wake sound that initiates further context analysis.

Thus, the context analysis model 120 may represent two or more ML models, which may be cascaded together, as referenced above and described in more detail, below, e.g., with respect to FIG. 3. In general, ML models used earlier in such a cascade or sequence may require less power and fewer resources, may rely on sensor signals that can be collected more frequently (or continuously), and may provide less information, than ML models used later in the cascade or sequence.

Context data 122 refers to any data that may be useful in determining or characterizing the context 104. For example, the context data 122 may include some subset of information collected from the sensor 110 or the camera 112, outputs of the context analysis model 120, and/or user preferences or user data of the user 106.

Meanwhile, camera criteria 126 refers to one or more thresholds, algorithms, or conditions that may be used by the camera controller 114 to control the camera 112. Many examples of the camera criteria 126 are provided below, but for the sake of illustration here, example criteria may include turning the camera 112 on for a defined time window (e.g., 3 seconds) when a context is classified by the context analysis model 120, or turning the camera 112 on when a confidence level of the context analysis model 120 in outputting context data 122 exceeds a defined threshold. It will be appreciated that the camera criteria 126 may thus vary based on various factors, including the types of sensor signals used, aspects of the context analysis model 120, and preferences (including privacy preferences) of the user 106.

When the camera controller 114 activates the camera 112 in response to the camera criteria 126, the camera 112 may proceed to capture one or more image frames of the context 104. Such image frames may be partially or completely stored in the context data 122, and may be processed by an image processing model 128. For example, the image processing model 128 may represent a CNN, a scale-invariant feature transform (SIFT) algorithm, support vector machines (SVMs), recurrent neural networks (RNNs), model(s) with a transformer/attention mechanism, and/or other ML model for processing visual input.

Consequently, the image processing model 128 may output an identification of the context 104 that is more detailed, more fine-grained, and/or having a higher confidence level, than the context information provided by the context analysis model 120. For example, as described in detail, below, with respect to FIG. 6, the context analysis model 120 may provide a context determination identifying the user 106 as being inside of a car, while the image processing model 128 may identify the user 106 as being either a driver or a passenger within the car. Some or all of the obtained outputs of the image processing model 128 may be stored in the context data 122.

Then, a context response handler 130 may be configured to process the context data 122 to determine and execute a response to the determined context information. In the simplified example of FIG. 1, the context response handler 130 may be configured to launch an application 132 that is experienced by the user 106 on a display 134, of the wearable device 108 and/or of another device. Of course, such a context response is provided merely by way of example, and many other context responses may be provided, some of which are described below for the sake of illustration.

The context response handler 130 may be implemented using a set of rules that define operations to be initiated in response to context determinations included within the context data 122. In other examples, as described below with respect to FIG. 3, the context response handler 130 may be implemented as a separate ML model.

FIG. 1 illustrates a number of example implementations and associated details, but is not limiting with respect to other additional or alternative implementations that may also be provided. For example, in FIG. 1, the camera controller 114 applies the camera criteria 126 to context data 122 obtained using the sensor 110 and outputs of the context analysis model 120, to determine whether and when to activate/deactivate the camera 112. In other implementations, one or more other controllers may similarly be used to activate/deactivate other sensors.

For example, a GPS sensor may be used to provide location information, and a GPS controller may apply GPS criteria to the context data 122 to determine whether and when to activate/deactivate a GPS sensor. In this way, the user 106 may be provided with increased privacy with respect to a location(s) of the user 106, while still obtaining advantages associated with location information. For example, the context response handler 130 may trigger responses based on a determined location of the user 106, when the GPS sensor is activated in the manner described above.

In additional examples, false positive and/or false negative activations of the camera 112 may be detected and remedied, to thereby improve operations of the context manager 102 over time. For example, by detecting false positive and/or false negative activations of the camera 112, the context manager 102 may provide enhanced privacy for the user 106, may further conserve power/resources, and may provide more personalized operations of the context manager 102 for the user 106.

For example, a false positive operation refers to an activation of the camera 112 that should not have occurred, based on an erroneous determination made by the context analysis model 120. For example, the context analysis model 120 may determine that the user 106 is located within a car, and the camera 112 may be activated to determine whether the user 106 is a driver or a passenger. Upon activation of the camera 112, the image processing model 128 may determine that the user 106 is not located in a car. The camera controller 114 may thus apply corresponding camera criteria 126 to immediately deactivate the camera, prior to completion of a time window designated for camera activation.

For example, the camera criteria 126 may nominally designate 3 seconds (or a number of image frames captured) for camera activation for the image processing model 128 to have sufficient context data 122 to make the designated driver/passenger determination. In the described example, the image processing model 128 may determine that the user 106 is not located in a car within 1 second of camera activation, or using only a single image frame. Then, the camera controller 114 may immediately deactivate the camera 112, thereby preserving battery power, computing resources, and a privacy of the user 106.

A false negative operation refers to a failure to activate the camera 112 when activation should have occurred. For example, the user 106 may prefer to have the application 132 triggered in a particular work environment or location, in order to perform an associated task. The context analysis model 120, however, may fail to detect the designated work environment, so that the camera 112 is not activated and the application 132 is not triggered.

To guard against such failures, the camera criteria 126 may specify that the camera 112 is activated periodically for a brief time, e.g., every 30 minutes (or at some other specified interval). Consequently, the specified work environment may be detected even if the context analysis model 120 fails, so that the user 106 merely experiences a delay in a desired result, rather than failing to receive the desired result at all.

In additional or alternative examples of false negative operations, the context analysis model 120 may be configured to output a percentage degree of confidence associated with corresponding context determinations. For example, the context analysis model 120 may determine that the user 106 is sitting with an x% degree of confidence, e.g., as compared to standing or lying down.

When the degree of confidence is reliably low, such as below 20%, then the camera criteria 126 may specify that the camera 112 is not activated at all, or is activated very infrequently. Conversely, when the degree of confidence is reliably high, such as above 80%, then the camera criteria 126 may specify that the camera 112 is activated immediately for a time window of, e.g., 5 seconds. When the degree of confidence is indeterminate, such as between 20% and 80%, then the camera criteria 126 may specify that the camera 112 is activated with an intermediate frequency.

Put another way, the camera 112 may be activated with a frequency or immediacy that varies in direct proportion with a confidence level of the output of the context analysis model 120. Accordingly, false negatives may be avoided, and the user 106 will be provided with a desired user experience with a minimum delay.

Further, a duration of the camera activation may also vary depending on the confidence level of the output of the context analysis model 120. That is, higher confidence levels may be associated with longer camera activation durations, while lower confidence levels may be associated with shorter camera activation durations.

Detections of both false positive and false negative operations of the context analysis model 120 may be used to improve operations of the context manager 102 over time. For example, data associated with a false positive or false negative operation may be added to the training data 118, and the training engine 116 may update or fine-tune the context analysis model accordingly, to minimize a likelihood of a similar false positive/negative operation in the future.

Figure 2:
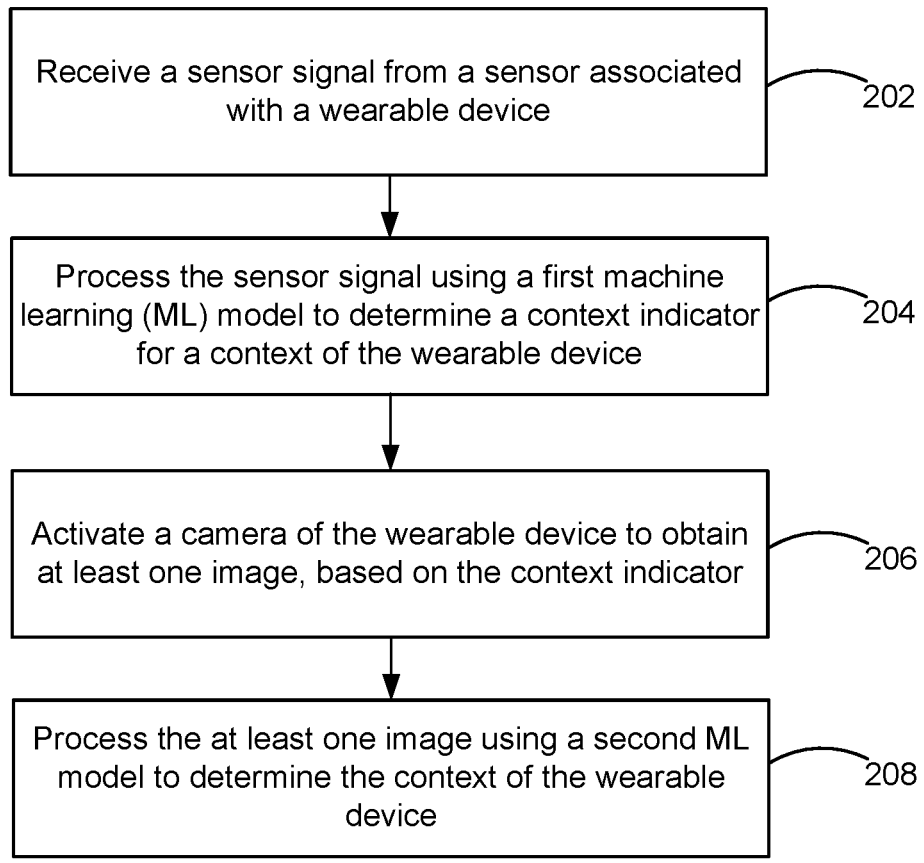
FIG. 2 is a flowchart illustrating example operations of the system of FIG. 1.

FIG. 2 is a flowchart illustrating example operations of the system of FIG. 1. In the example of FIG. 2, operations 202-208 are illustrated as separate, sequential operations. However, in various example implementations, the operations 202-208 may be implemented in a different order than illustrated, in an overlapping or parallel manner, and/or in a nested, iterative, looped, or branched fashion. Further, various operations or sub-operations may be included, omitted, or substituted.

In FIG. 2, a sensor signal may be received from a sensor associated with a wearable device (202). For example, a sensor signal may be received from one or more sensors represented by the sensor 110 in FIG. 1. As referenced above, the sensor 110 may be a sensor(s) of the wearable device 108, or may be associated with another wearable device (or other device, such as a smartphone) that is in communication with the wearable device 108.

The sensor signal may be processed using a first machine learning (ML) model to determine a context indicator for a context of the wearable device (204). For example, the context analysis model 120 of FIG. 1 may determine a context indicator for inclusion in the context data 122, perhaps with selected values of the sensor signal. As described herein, the context indicator may include a percentage-based confidence indication with respect to a potential context of the context 104. Additionally, or alternatively, the context analysis model 120 may be implemented as a classifier, so that the confidence indicator may identify a detected class of two or more context classes, perhaps along with a corresponding degree of confidence. For example, potential classes to be classified may include sitting, lying, walking, or running classes.

A camera of the wearable device may be activated to obtain at least one image, based on the context indicator (206). For example, the camera controller 114 may apply the camera criteria 126 to the context data 122 that includes outputs of the context analysis model 120, and optionally includes corresponding or selected values of sensor signals from the sensor 110. The camera criteria 126 may specify criteria for whether to activate the camera 112 at all, and/or criteria defining a duration of camera activation. For example, the camera 112 may not be activated at all if the context indicator indicates that no further context analysis is required. In other examples, as described above, camera activation duration may be specified with respect to a degree of confidence of the output of the context analysis model 120. For example, higher degrees of confidence may result in longer durations of activation. In other examples, camera activation duration may be specified with respect to available resources. For example, camera activation duration may be reduced when battery and/or computational resources are low, or need to be conserved.

The at least one image may be processed using a second ML model to determine the context of the wearable device (208). For example, the image processing model 128 may process one or more images received from the camera 112, perhaps in conjunction with the previously-received output of the context analysis model 120 and/or the sensor 110.

As described above, one or more actions may be triggered (or suppressed) in response to the determined context. For example, the context response handler 130 may trigger the launch of, or a feature of, the application 132.

For example, as referenced above, the context analysis model 120 may use the sensor 110 to determine whether the user is currently walking, running, sitting, or lying down. However, such a determination may be insufficient to determine more fine-grained detail with respect to the detected activity.

For example, when the user 106 is determined to be walking, the camera 112 may be activated to determine whether the user is walking on a road, walking within a store while shopping, or walking within an office during work activities. Consequently, the context response handler 130 may determine to launch an exercise application and/or GPS map when exercising, an application to facilitate finding or making a desired purchase while shopping, or an application used to facilitate work duties while in the office.

Thus, described techniques of FIGS. 1 and 2 use inexpensive and efficient sensors, along with relatively simple ML model(s), to provide an initial context indication, while consuming a minimum of battery and/or computational resources. Then, cameras, GPS sensors, or other sensors, along with more complex ML model(s), may be used to make a final context determination. The user 106 may easily designate a level of privacy desired, e.g., by specifying triggers and durations for use of the camera 112, which may then be stored in the camera criteria 126.

Figure 3:
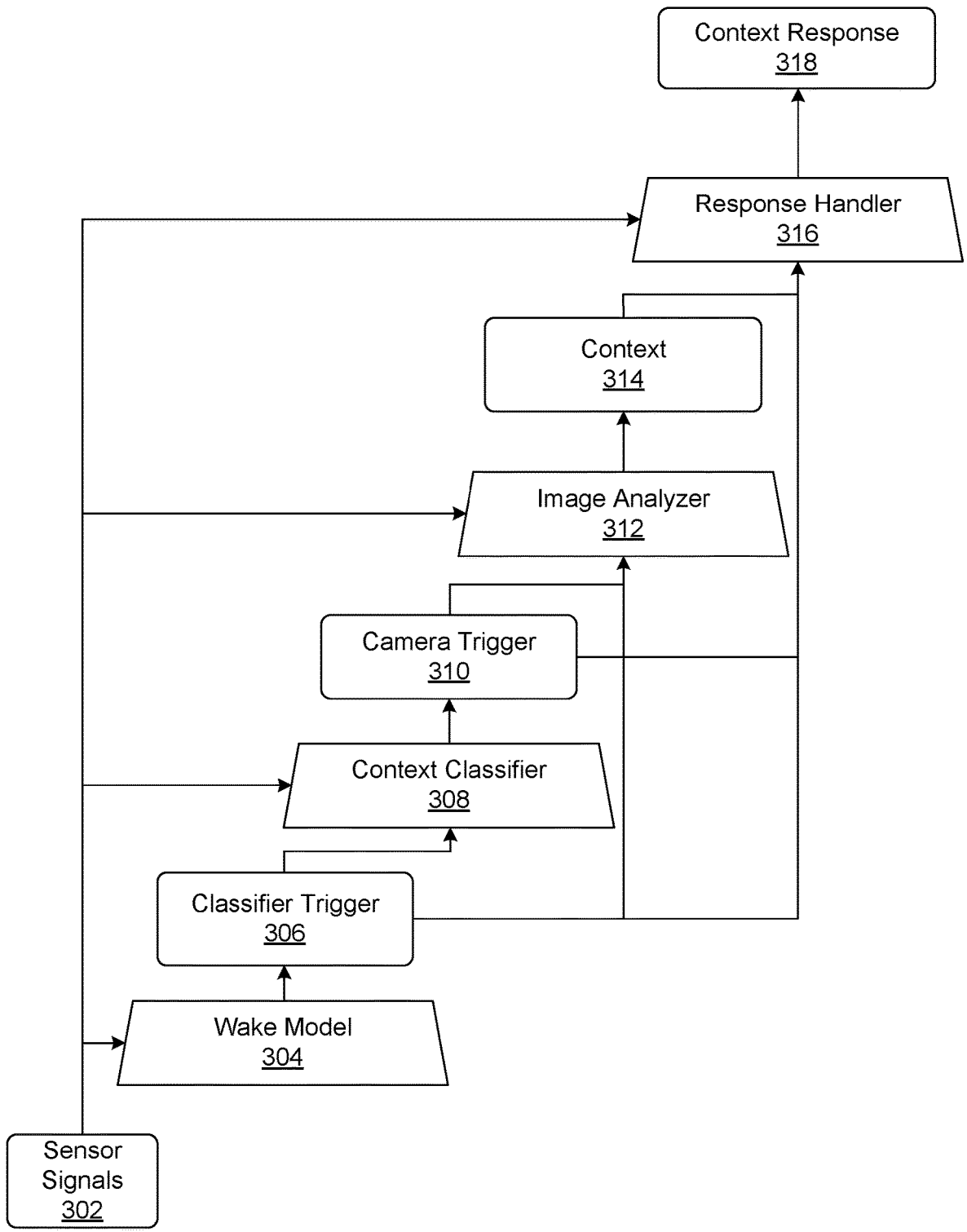
FIG. 3 is a block diagram illustrating a more detailed example implementation of the system of FIG. 1.

FIG. 3 is a block diagram illustrating a more detailed example implementation of the system of FIG. 1. FIG. 3 illustrates an example implementation with a cascading, multi-stage, waterfall-style architecture, in which each stage informs the next, to obtain a desired context response.

As shown, sensor signal(s) 302 are received at a first stage that includes a wake model 304. For example, the wake model 304 may represent a ML model that runs continuously or very frequently to determine a wake signal that could occur at any time. For example, an audio sensor (microphone) may run continuously to determine a wake word or a wake sound. For example, a wake sound might include a sound of a car door closing, or other sound that might be likely to indicate a transition of the user 106 to a new context. The wake model 304 may be implemented as a trained machine learning model, or, in other scenarios, may execute a set of rules for responding to one or more detected sensor signals of varying type(s).

The wake model 304 may thus output a classifier trigger 306, which may, if activated, activate operations of a context classifier 308. For example, the context classifier 308 may represent an example of the context analysis model 120 of FIG. 1.

As shown, the context classifier 308 may receive the same and/or additional ones of the sensor signals 302, in addition to the classifier trigger 306, to thereby output a camera trigger 310. For example, a type of sensor signal(s) 302 used by the context classifier 308 may vary based on the classifier trigger 306.

In example implementations, either or both of the wake model 304 or the context classifier 308 may leverage another ML model being used by the wearable device 108. For example, the wearable device 108 may provide a transcription and/or summarization function(s), in which an audio transcript is captured and streamed on the display 134 for the user 106, and/or a summary stream may be captured and streamed. For example, a summarizer ML model may process input text data to obtain output text data having a reduced volume. For example, such a summarizer may be implemented as a sequence-to-sequence generative large learning model (LLM). Then, a detected word or phrase within the transcribed and/or summarized content may be used as the classifier trigger 306 and/or the camera trigger 310.

The camera trigger 310 may thus activate the camera 112 and associated image analyzer 312, where the latter provides an example of the image processing model 128. As described above, the image analyzer 312 may thus receive image frames from the camera 112 as an example of the sensor signals 302, along with any other relevant sensor signals. The camera trigger 310 may specify a duration of camera activation, which may depend on a nature of the sensor signals 302 and/or on earlier operations of the cascaded architecture of FIG. 3. For example, different classifier trigger(s) 306 and/or camera trigger(s) 310 may be associated with different camera activation durations, and/or may cause execution of the image analyzer 312 with different parameterizations/inputs.

Accordingly, the image analyzer 312 may output a determined context 314. The context 314 may represent a confirmation of an earlier-determined context by the context classifier 308, or may represent or include additional detail or characterization of the earlier-determined context.

In this way, a response handler 316 may process the determined context 314, perhaps in conjunction earlier-determined outputs including in the classifier trigger 306 and/or the camera trigger 310, as well as in conjunction with some or all of the previously used sensor signals 302. As described, the response handler 316, as an instance of the context response handler 130, may be implemented as a ML model that processes the various available inputs to determine the context response 318, or may be implemented as a set of rules processed to determine the context response.

Although FIG. 3 is illustrated as a sequence of activated models, it will be appreciated from the present description that any of the cascaded models may provide an output that does not, in a given instance, activate a subsequent model. For example, the context classifier 308 may provide a relatively coarse-grained context determination that is sufficient for a given use case scenario, and that does not require triggering of a camera or other second sensor.

Figure 4:
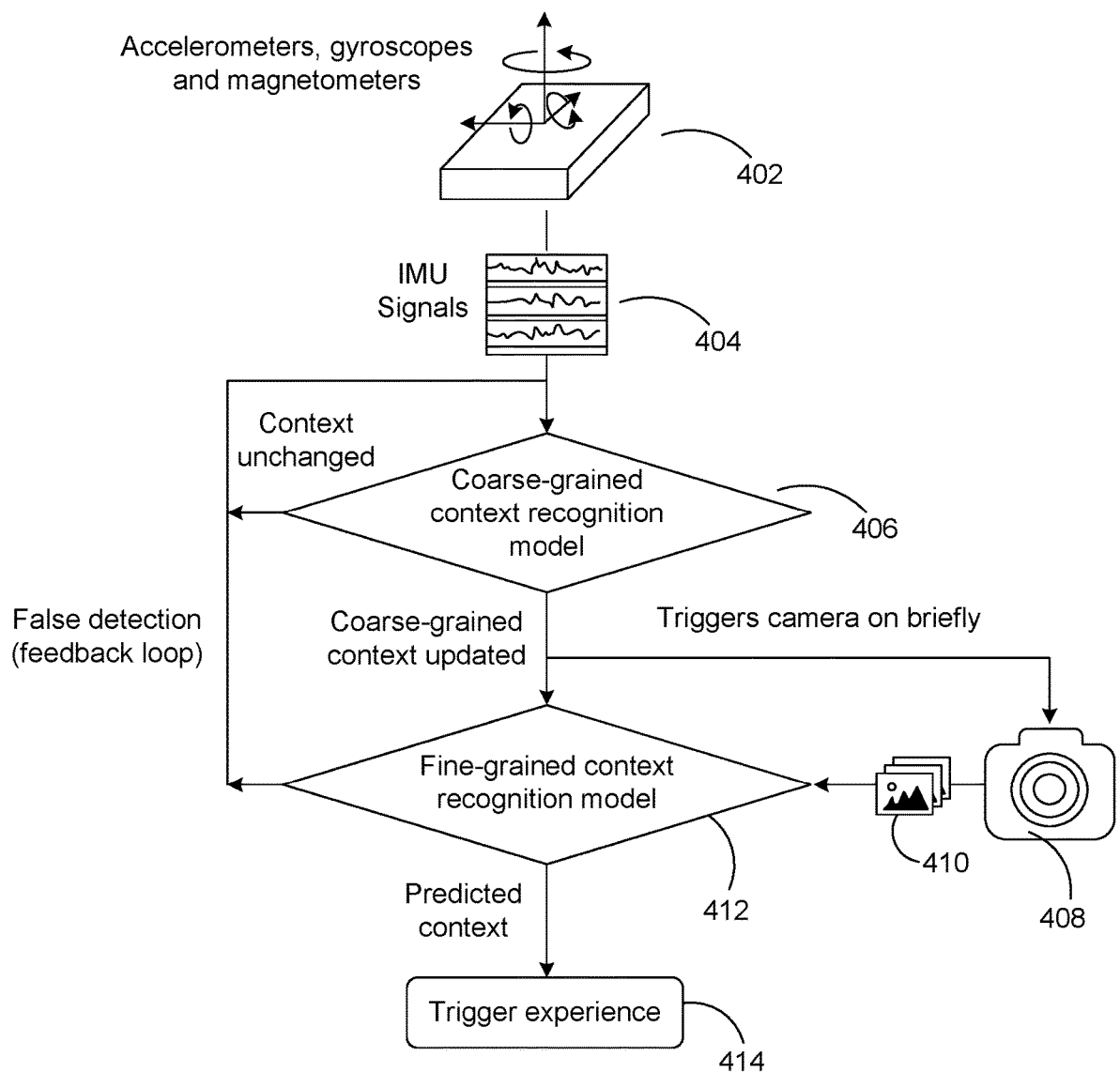
FIG. 4 is a flowchart illustrating more detailed example operations of the system of FIG. 1.

FIG. 4 is a flowchart illustrating more detailed example operations of the system of FIG. 1. In the example of FIG. 4, sensors 402 may include, as shown and as referenced above, one or more accelerometers, gyroscopes, and magnetometers, which produce various types or combinations of IMU signals 404.

For example, the IMU signals 404 may be captured frequently or continuously, so that a coarse-grain context recognition model may establish a baseline of normal or expected IMU values. Then, the coarse-grain context recognition model may determine, from the baseline of IMU values, whether the context is unchanged or has been updated (406). As long as the context is unchanged, the coarse-grain context recognition model may continue to receive the IMU signals 404.

If the coarse-grain context recognition model determines an updated context, the camera 408 may be triggered to be briefly turned on, to thereby capture one or more image frames 410. For example, the camera 408 may be turned on for a defined time window, or until a pre-defined type and/or quantity of information is captured.

Then, a fine-grain context recognition model may confirm or update the context recognition provided by the coarse-grain context recognition model (412). The predicted context may thus be used to trigger a pre-defined experience (414) or other response.

If, however, a false detection is determined by the fine-grain context recognition model, then no experience may be triggered, and the process may return to monitoring IMU signals 404, as shown. For example, the camera 408 may be manually deactivated, or the fine-grain context recognition model may determine that the coarse-grain context recognition model was incorrect in its initial context classification.

Figure 5:
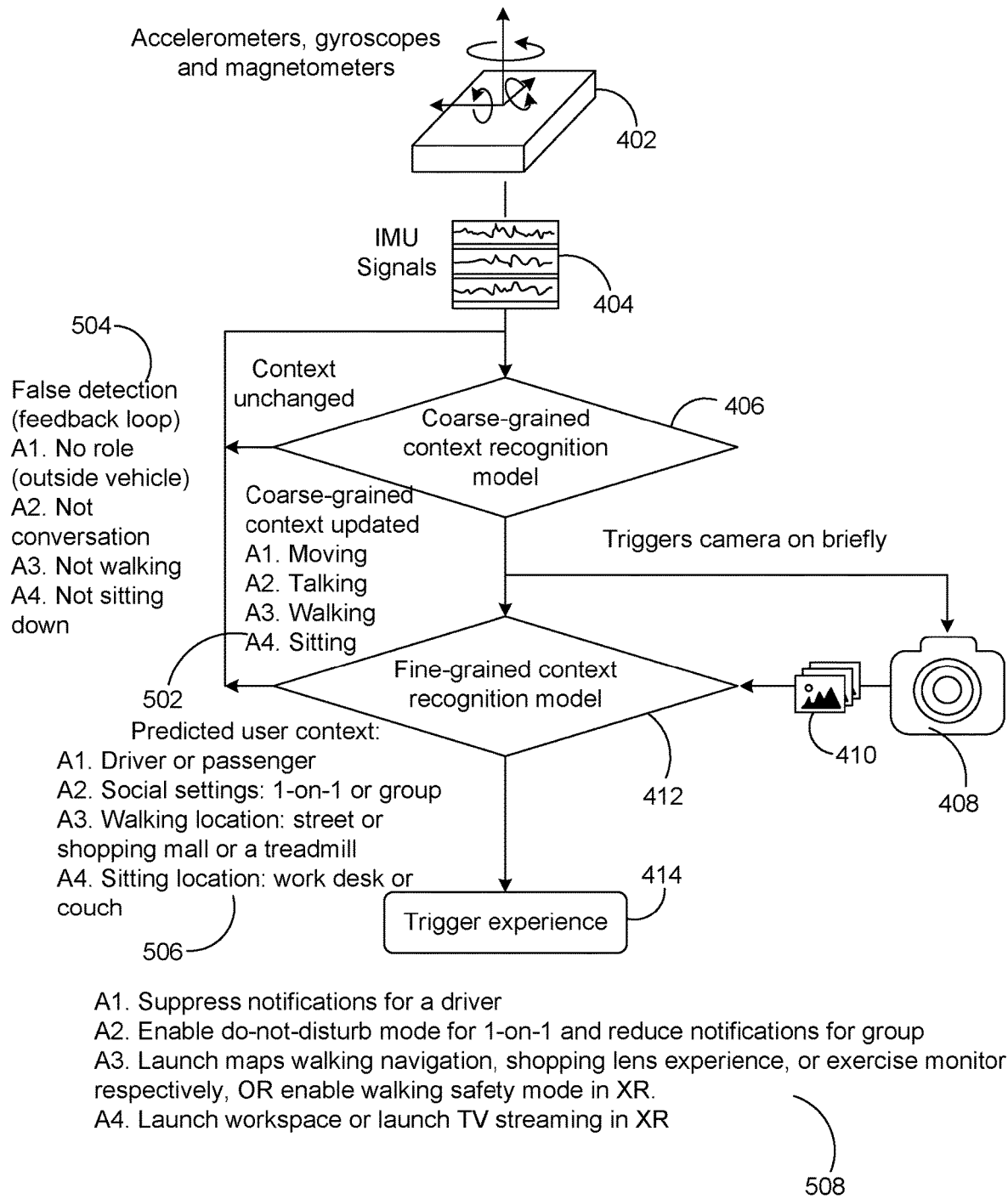
FIG. 5 is a flowchart illustrating specific example applications for the flowchart of FIG. 4.

FIG. 5 is a flowchart illustrating specific example applications for the flowchart of FIG. 4. As shown, FIG. 5 illustrates a set 502 of coarse-grain context recognition model updates, a set 504 of unchanged contexts determined by a coarse-grain context recognition model, a set 506 of predicted users contexts, and a set 508 of triggered experiences/actions.

Within the sets 502-508, FIG. 5 illustrates a first example labelled A1, in which an initially recognized context is illustrated as 'moving,' such as in an automobile. Using an image from the camera 408, the fine-grain context recognition model may determine whether the user is a driver or a passenger in the moving automobile, and, if the user is a driver, notifications for the user/driver may be suppressed. Or, the fine-grain context recognition model may determine that the user is not within an automobile at all, e.g., may be outside of a vehicle.

A second example is labelled A2, in which an initially recognized context is illustrated as 'talking.' Using an image from the camera 408, the fine-grain context recognition model may determine whether the user is talking in a one-on-one or group context. If the user is talking in a one-on-one context, do not disturb mode may be activated, or, if talking in a group setting, notifications may be reduced to include only urgent notifications. Or, the fine-grain context recognition model may determine that the user is not talking to other people at all, e.g., may not be facing any other person.

A third example is labelled A3, in which an initially recognized context is illustrated as 'walking.' Using an image from the camera 408, the fine-grain context recognition model may determine whether the user is classified as walking in a recognized setting, e.g., on a street, in a shopping mall, or on a treadmill. Based thereon, a respective experience may be launched, such as launching a maps/navigation application, launching a shopping visual search experience, launching an exercise monitor. In additional or alternative examples, a walking safety mode may be activated. Or, the fine-grain context recognition model may determine that the user is not walking at all, e.g., is not moving as determined from comparisons of consecutive image frames 410.

A fourth example is labelled A4, in which an initially recognized context is illustrated as 'sitting down.' Using an image from the camera 408, the fine-grain context recognition model may determine whether the user is sitting at a work desk, or on a couch. If the user is sitting at work, a workspace may be launched, whereas if the user is sitting on a couch, television streaming may be launched in an available extended reality (XR) experience. Or, the fine-grain context recognition model may determine that the user is not sitting at all.

Figure 6:
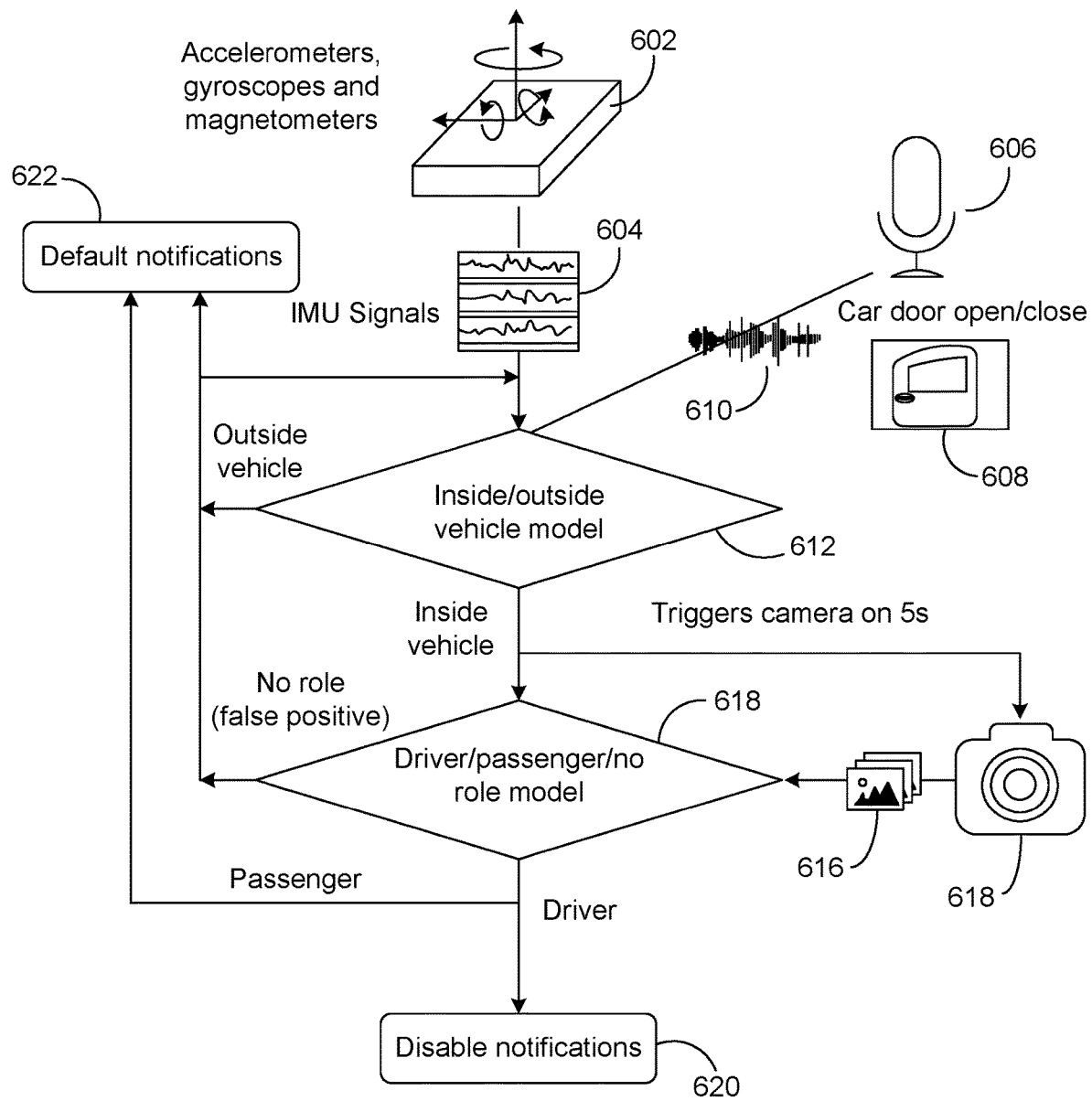
FIG. 6 is a flowchart illustrating example operations of the flowchart of FIG. 4 with respect to an automobile context.

FIG. 6 is a flowchart illustrating example operations of the flowchart of FIG. 4 with respect to an automobile context. In FIG. 6, as in FIGS. 4 and 5, sensors 602 provide IMU signals 604. However, coarse-grain context determination (612) to determine whether the user is inside or outside of a vehicle is only triggered when a separate sensor, microphone 606, captures the sound 608 of a car door opening/closing, which may then be provided as audio signal 610.

If the determination is then made that the user is outside of a vehicle, then the IMU signals 604 may continue to be collected. Also, notification(s) 622 may continue to be provided in a normal or default manner.

If the determination is made (612) that the user is inside a vehicle, then a triggering of camera 614 for a 5 second time window may be initiated, and corresponding image frames 616 may be captured. Then, a fine-grain determination may be made (618) as to whether the user is a driver or a passenger, or if no role can be determined.

If the user is determined to be the driver, then notifications may be disabled (620). Otherwise, if the user is determined to be a passenger, or if no role is determined, then default notifications may be maintained (622).

As described and referenced above, to increase model(s) accuracy over time, a feedback loop may be used to identify false positives and shut down an incorrectly activated camera. For example, if the coarse grain model falsely detects the user is inside a vehicle, but the fine-grain (vision) model determines the user is not inside the car, the vision model and the camera may be deactivated and the status may be corrected to say that the user is outside the vehicle.

Additionally, as also noted above, false negatives may be avoided by periodically turning on the camera even if there's no detected change in IMU signals by a coarse-grain model. The fine-grain model may also trigger a camera if the coarse-grain model confidence is low. For example, if the coarse-grain model starts to detect a lot of mixed signals (e.g., when the car is moving slowly or frequently stopping in traffic), the camera may be turned on to check whether the user is still in the vehicle.

Figure 7:
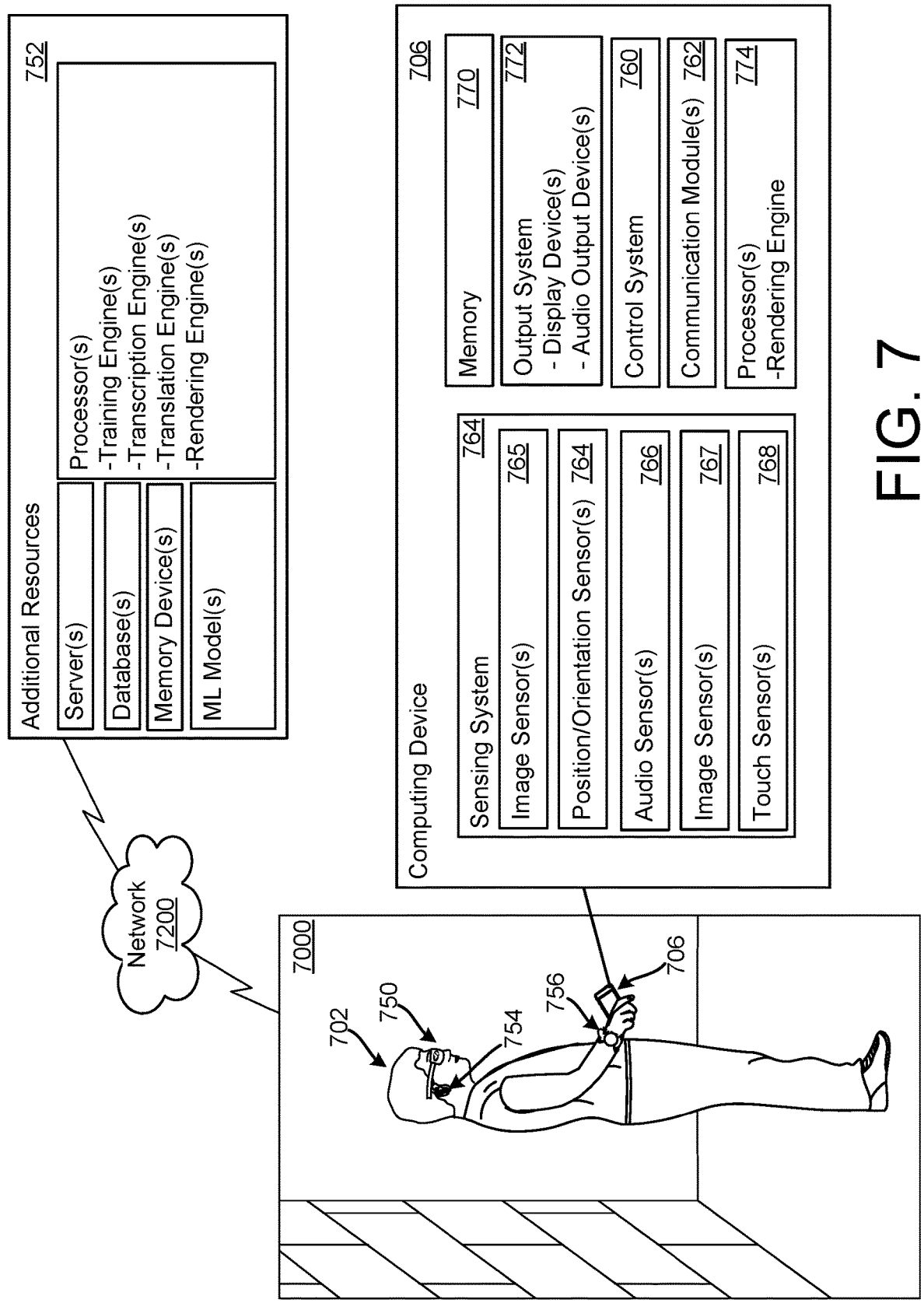
FIG. 7 is a third person view of a user in an ambient computing environment.

FIG. 7 is a third person view of a user 702 (analogous to the user 106 of FIG. 1) in an ambient environment 7000, with one or more external computing systems shown as additional resources 752 that are accessible to the user 702 via a network 7200. FIG. 7 illustrates numerous different wearable devices that are operable by the user 702 on one or more body parts of the user 702, including a first wearable device 750 in the form of glasses worn on the head of the user, a second wearable device 754 in the form of ear buds worn in one or both ears of the user 702, a third wearable device 756 in the form of a watch worn on the wrist of the user, and a computing device 706 held by the user 702. In FIG. 7, the computing device 706 is illustrated as a handheld computing device, but may also be understood to represent any personal computing device, such as a table or personal computer.

In some examples, the first wearable device 750 is in the form of a pair of smart glasses including, for example, a display, one or more images sensors that can capture images of the ambient environment, audio input/output devices, user input capability, computing/processing capability and the like. Additional examples of the first wearable device 750 are provided below, with respect to FIGS. 8A and 8B.

In some examples, the second wearable device 754 is in the form of an ear worn computing device such as headphones, or earbuds, that can include audio input/output capability, an image sensor that can capture images of the ambient environment 7000, computing/processing capability, user input capability and the like. In some examples, the third wearable device 756 is in the form of a smart watch or smart band that includes, for example, a display, an image sensor that can capture images of the ambient environment, audio input/output capability, computing/processing capability, user input capability and the like. In some examples, the handheld computing device 706 can include a display, one or more image sensors that can capture images of the ambient environment, audio input/output capability, computing/processing capability, user input capability, and the like, such as in a smartphone. In some examples, the example wearable devices 750, 754, 756 and the example handheld computing device 706 can communicate with each other and/or with external computing system(s) 752 to exchange information, to receive and transmit input and/or output, and the like. The principles to be described herein may be applied to other types of wearable devices not specifically shown in FIG. 7 or described herein.

The user 702 may choose to use any one or more of the devices 706, 750, 754, or 756, perhaps in conjunction with the external resources 752, to implement any of the implementations described above with respect to FIGS. 1-6. For example, the user 702 may use an application executing on the device 706 and/or the smartglasses 750 to execute the context manager 102 of FIG. 1.

As referenced above, the device 706 may access the additional resources 752 to facilitate the various context determination techniques described herein, or related techniques. In some examples, the additional resources 752 may be partially or completely available locally on the device 706. In some examples, some of the additional resources 752 may be available locally on the device 706, and some of the additional resources 752 may be available to the device 706 via the network 7200. As shown, the additional resources 752 may include, for example, server computer systems, processors, databases, memory storage, and the like. In some examples, the processor(s) may include training engine(s), transcription engine(s), translation engine(s), rendering engine(s), and other such processors. In some examples, the additional resources may include ML model(s), such as the various ML models of the architectures of FIGS. 1 and/or 3.

The device 706 may operate under the control of a control system 760. The device 706 can communicate with one or more external devices, either directly (via wired and/or wireless communication), or via the network 7200. In some examples, the one or more external devices may include various ones of the illustrated wearable computing devices 750, 754, 756, another mobile computing device similar to the device 706, and the like. In some implementations, the device 706 includes a communication module 762 to facilitate external communication. In some implementations, the device 706 includes a sensing system 764 including various sensing system components. The sensing system components may include, for example, one or more image sensors 765, one or more position/orientation sensor(s) 764 (including for example, an inertial measurement unit, an accelerometer, a gyroscope, a magnetometer and other such sensors), one or more audio sensors 766 that can detect audio input, one or more image sensors 767 that can detect visual input, one or more touch input sensors 768 that can detect touch inputs, and other such sensors. The device 706 can include more, or fewer, sensing devices and/or combinations of sensing devices.

Captured still and/or moving images may be displayed by a display device of an output system 772, and/or transmitted externally via a communication module 762 and the network 7200, and/or stored in a memory 770 of the device 706. The device 706 may include one or more processor(s) 774. The processors 774 may include various modules or engines configured to perform various functions. In some examples, the processor(s) 774 may include, e.g. training engine(s), transcription engine(s), translation engine(s), rendering engine(s), and other such processors. The processor(s) 774 may be formed in a substrate configured to execute one or more machine executable instructions or pieces of software, firmware, or a combination thereof. The processor(s) 774 can be semiconductor-based including semiconductor material that can perform digital logic. The memory 770 may include any type of storage device or non-transitory computer-readable storage medium that stores information in a format that can be read and/or executed by the processor(s) 774. The memory 770 may store applications and modules that, when executed by the processor(s) 774, perform certain operations. In some examples, the applications and modules may be stored in an external storage device and loaded into the memory 770.

Although not shown separately in FIG. 7, it will be appreciated that the various resources of the computing device 706 may be implemented in whole or in part within one or more of various wearable devices, including the illustrated smartglasses 750, earbuds 754, and smartwatch 756, which may be in communication with one another to provide the various features and functions described herein. For example, the memory 770 may be used to implement the context data 122 and the camera criteria 126.

Figure 8A:
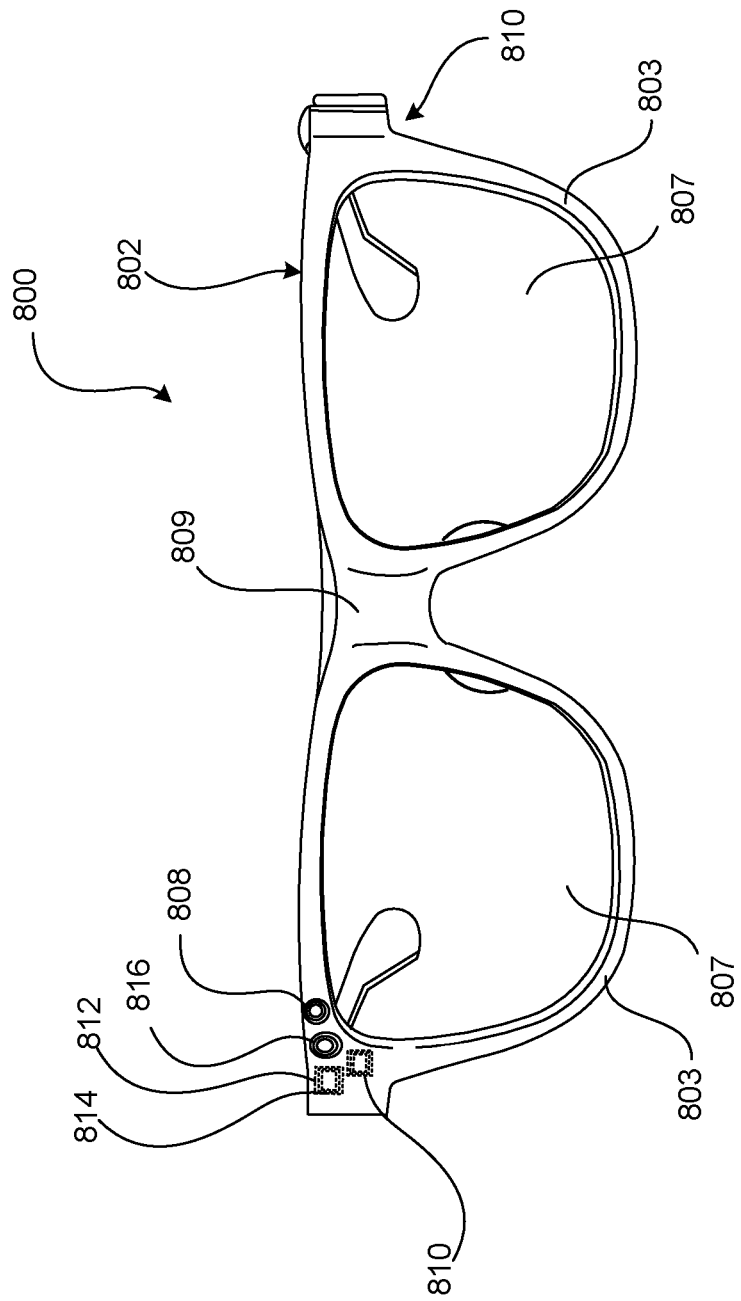
FIGS. 8A and 8B illustrate front and rear views of an example implementation of a pair of smartglasses.
Figure 8B:
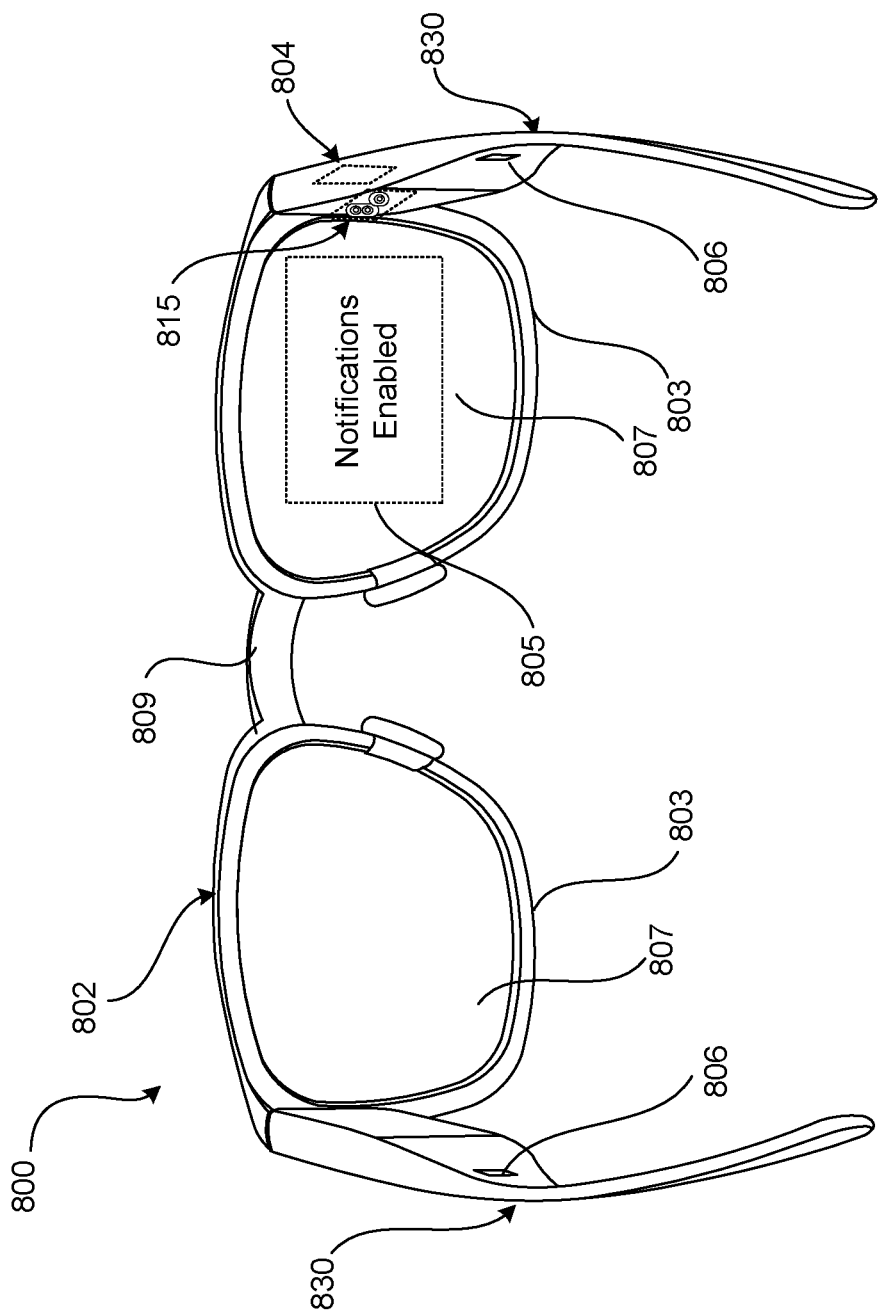

An example head mounted wearable device 800 in the form of a pair of smart glasses is shown in FIGS. 8A and 8B, for purposes of discussion and illustration. The example head mounted wearable device 800 includes a frame 802 having rim portions 803 surrounding glass portion, or lenses 807, and arm portions 830 coupled to a respective rim portion 803. In some examples, the lenses 807 may be corrective/prescription lenses. In some examples, the lenses 807 may be glass portions that do not necessarily incorporate corrective/prescription parameters. A bridge portion 809 may connect the rim portions 803 of the frame 802. In the example shown in FIGS. 8A and 8B, the wearable device 800 is in the form of a pair of smart glasses, or augmented reality glasses, simply for purposes of discussion and illustration.

In some examples, the wearable device 800 includes a display device 804 that can output visual content, for example, at an output coupler providing a visual display area 805, so that the visual content is visible to the user. In the example shown in FIGS. 8A and 8B, the display device 804 is provided in one of the two arm portions 830, simply for purposes of discussion and illustration. Display devices 804 may be provided in each of the two arm portions 830 to provide for binocular output of content. In some examples, the display device 804 may be a see through near eye display. In some examples, the display device 804 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 807, next to content (for example, digital images, user interface elements, virtual content, and the like) output by the display device 804. In some implementations, waveguide optics may be used to depict content on the display device 804.

The example wearable device 800, in the form of smart glasses as shown in FIGS. 8A and 8B, includes one or more of an audio output device 806 (such as, for example, one or more speakers), an illumination device 808, a sensing system 810, a control system 812, at least one processor 814, and an outward facing image sensor 816 (for example, a camera). In some examples, the sensing system 810 may include various sensing devices and the control system 812 may include various control system devices including, for example, the at least one processor 814 operably coupled to the components of the control system 812. In some examples, the control system 812 may include a communication module providing for communication and exchange of information between the wearable device 800 and other external devices. In some examples, the head mounted wearable device 800 includes a gaze tracking device 815 to detect and track eye gaze direction and movement. Data captured by the gaze tracking device 815 may be processed to detect and track gaze direction and movement as a user input. In the example shown in FIGS. 8A and 8B, the gaze tracking device 815 is provided in one of two arm portions 830, simply for purposes of discussion and illustration. In the example arrangement shown in FIGS. 8A and 8B, the gaze tracking device 815 is provided in the same arm portion 830 as the display device 804, so that user eye gaze can be tracked not only with respect to objects in the physical environment, but also with respect to the content output for display by the display device 804. In some examples, gaze tracking devices 815 may be provided in each of the two arm portions 830 to provide for gaze tracking of each of the two eyes of the user. In some examples, display devices 804 may be provided in each of the two arm portions 830 to provide for binocular display of visual content.

The wearable device 800 is illustrated as glasses, such as smartglasses, augmented reality (AR) glasses, or virtual reality (VR) glasses. More generally, the wearable device 800 may represent any head-mounted device (HMD), including, e.g., a hat, helmet, or headband. Even more generally, the wearable device 800 and the computing device 706 may represent any wearable device(s), handheld computing device(s), or combinations thereof.

Use of the wearable device 800, and similar wearable or handheld devices such as those shown in FIG. 7, enables useful and convenient use case scenarios of implementations of FIGS. 1-6. For example, as shown in FIG. 8B, the display area 805 may be used to display actions taken by the context manager 102, such as enabling notifications. More generally, the display area 805 may be used to provide any of the functionality described with respect to FIGS. 1-6 that may be useful in operating the context manager 102. For example, the display area 805 may be used to display captured images or other information used to determine context, or may display a name or other characteristics of a determined context.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

In some implementations, one or more input devices in addition to the computing device (e.g., a mouse, a keyboard) can be rendered in a display of an HMD, such as the HMD 800. The rendered input devices (e.g., the rendered mouse, the rendered keyboard) can be used as rendered in the display.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise.

It will be further understood that the terms "comprises," "comprising." "includes," and/or "including." when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer program product, the computer program product being tangibly embodied on a non-transitory computer-readable storage medium and comprising instructions that, when executed by at least one computing device, are configured to cause the at least one computing device to:
receive a sensor signal from a sensor associated with a wearable device;
process the sensor signal using a first machine learning model to determine a context and an indicator of a confidence of the context of the wearable device;
activate, based on the indicator of the confidence, a camera of the wearable device for a time window to obtain at least one image;
deactivate the camera upon completion of the time window; and process the at least one image using a second machine learning model to determine the context of the wearable device.

2. The computer program product of claim 1, wherein the sensor includes an inertial measurement unit (IMU), and wherein the instructions, when executed by the at least one computing device, are further configured to cause the at least one computing device to:
receive the sensor signal from the IMU to determine movement characteristics of the wearable device.

3. The computer program product of claim 1, wherein the instructions, when executed by the at least one computing device, are further configured to cause the at least one computing device to:
receive the sensor signal from the sensor, with the sensor being integrated with the wearable device.

4. The computer program product of claim 1, wherein the first machine learning model is a classifier trained to classify the sensor signal as being associated with one of a plurality of context classes, and wherein the instructions, when executed by the at least one computing device, are further configured to cause the at least one computing device to:
determine the context as being associated with at least one context class of the plurality of context classes.

5. The computer program product of claim 1, wherein the instructions, when executed by the at least one computing device, are further configured to cause the at least one computing device to:
determine that the confidence exceeds a threshold with respect to the context.

6. The computer program product of claim 1, wherein the instructions, when executed by the at least one computing device, are further configured to cause the at least one computing device to:
determine that the confidence is below a threshold with respect to the context.

7. The computer program product of claim 1, wherein the instructions, when executed by the at least one computing device, are further configured to cause the at least one computing device to:
activate the camera for the time window;
determine that the context as determined from the sensor signal was erroneous; and
deactivate the camera.

8. The computer program product of claim 1, wherein the instructions, when executed by the at least one computing device, are further configured to cause the at least one computing device to:
process the at least one image using a convolutional neural network (CNN) as the second machine learning model.

9. The computer program product of claim 1, wherein the instructions, when executed by the at least one computing device, are further configured to cause the at least one computing device to:
execute an action of the wearable device, based on the context.

10. A wearable device comprising:
at least one memory;
at least one processor;
at least one sensor; and
at least one camera;
wherein the at least one processor, when executing instructions stored using the at least one memory, causes the wearable device to
receive a sensor signal from the at least one sensor;
process the sensor signal using a first machine learning model to
determine a context and an indicator of a confidence of the context of the wearable device;
activate, based on the indicator of the confidence, the at least one camera for a time window to obtain at least one image;
deactivate the camera upon completion of the time window; and
process the at least one image using a second machine learning model to determine the context of the wearable device.

11. The wearable device of claim 10, wherein the confidence exceeds a threshold with respect to the context.

12. The wearable device of claim 10, wherein the first machine learning model is a classifier trained to classify the sensor signal as being associated with one of a plurality of context classes, and wherein the at least one processor, when executing instructions stored using the at least one memory, causes the wearable device to:
determine the context as being associated with at least one context class of the plurality of context classes.

13. The wearable device of claim 10, wherein the at least one processor, when executing instructions stored using the at least one memory, causes the wearable device to:
execute an action of the wearable device, based on the context.

14. A method comprising:
receiving a sensor signal from a sensor associated with a wearable device;
processing the sensor signal using a first machine learning model to determine a context and an indicator of a confidence of the context of the wearable device;
activating, based on the indicator of the confidence, a camera of the wearable device for a time window to obtain at least one image;
deactivateing the camera upon completion of the time window; and
processing the at least one image using a second machine learning model to determine the context of the wearable device.

15. The method of claim 14, wherein the confidence exceeds a threshold with respect to the context.

16. The method of claim 14, wherein the first machine learning model is a classifier trained to classify the sensor signal as being associated with one of a plurality of context classes, the method further comprising:
- determining the context as being associated with at least one context class of the plurality of context classes.

17. The method of claim 14, further comprising:
- executing an action of the wearable device, based on the context.

* * * * *